United States Patent
Yamaguchi

[11] Patent Number: 5,999,648
[45] Date of Patent: Dec. 7, 1999

[54] CHARACTER-FIGURE EDITING APPARATUS AND METHOD

[75] Inventor: Koji Yamaguchi, Kanagawa-ken, Japan

[73] Assignee: Kabushiki Kaisha Toshiba, Kanagawa-ken, Japan

[21] Appl. No.: 08/613,927

[22] Filed: Mar. 11, 1996

[30] Foreign Application Priority Data

Mar. 16, 1995 [JP] Japan ................................. 7-057042

[51] Int. Cl.$^6$ .................................................. G06K 9/62
[52] U.S. Cl. ......................... 382/189; 382/311; 707/541
[58] Field of Search .................................... 382/309, 310, 382/311, 186, 187, 189, 316; 345/173, 179; 178/18, 19, 20, 18.05, 19.04; 707/541

[56] References Cited

U.S. PATENT DOCUMENTS

| | | | |
|---|---|---|---|
| 4,739,317 | 4/1988 | Berry et al. | 345/133 |
| 5,121,442 | 6/1992 | Togawa et al. | 382/187 |
| 5,397,865 | 3/1995 | Park | 178/18.05 |
| 5,404,439 | 4/1995 | Moran et al. | 345/326 |
| 5,448,475 | 9/1995 | Senoo et al. | 364/419.1 |
| 5,502,803 | 3/1996 | Yoshida et al. | 395/146 |
| 5,513,309 | 4/1996 | Meier et al. | 345/179 |
| 5,523,775 | 6/1996 | Capps | 345/179 |
| 5,583,542 | 12/1996 | Capps et al. | 345/173 |
| 5,608,858 | 3/1997 | Kurosu et al. | 345/326 |
| 5,748,110 | 5/1998 | Sekizawa et al. | 345/173 |

*Primary Examiner*—Jon Chang
*Attorney, Agent, or Firm*—Graham & James LLP

[57] ABSTRACT

In a character-figure editing apparatus, a user can correctly select a desired character or figure from a plurality of characters and figures on a display section. The user inputs the character, the figure, and the editing operation by handwriting. A decision section identifies the handwritten information as one of the character, the figure and the editing operation. A memory section stores the character information and the figure information identified by the decision section. A display section displays the input handwriting information, the character and the figure stored in the memory section. The input handwritten information is temporarily stored as a series of coordinates in order. The decision section selects a corresponding character or figure in accordance with the input handwritten information when the handwritten information is identified as the editing operation. Then an editing section edits the character or the figure in accordance with the editing operation.

9 Claims, 15 Drawing Sheets

| | TIME | X-COORDINATE | Y-COORDINATE | SWITCH | PEN-DISTANCE | PEN-SLOPE |
|---|---|---|---|---|---|---|
| ① | 0 : 12 : 34.0 | 100 | 100 | ON | 0 | 70 |
| ② | 0 : 12 : 34.1 | 120 | 120 | – | 0 | 72 |
| ③ | 0 : 12 : 34.2 | 120 | 110 | – | 5 | 70 |
| ④ | 0 : 12 : 34.3 | 120 | 100 | – | 0 | 73 |
| ⑤ | 0 : 12 : 34.4 | 100 | 120 | OFF | 0 | 60 |
| | ... | ... | ... | ... | ... | ... |

| HANDWRITING | EDITING OPERATION |
|---|---|
| ✕ | ERASE |
| → | MOVE |
| ⊚ ↘ | MAGNIFICATION |
| ⊚ ↗ | REDUCTION |

| NUMBER | KIND | ATTRIBUTE INFORMATION | COORDINATE SERIES INFORMATION (X, Y, PEN-DISTANCE, PEN-SLOPE) |
|---|---|---|---|
| 11 | CHARACTER | AREA: (100, 100) – (120, 110)<br>CHARACTERS: "USP"<br>SIZE: 10 pt | (100, 100, 0, 60) – (105, 103, 10, 65) –<br>(110, 107, 5, 63) – (120, 110, 0, 60) – · · · |
| 12 | FIGURE | KIND: CIRCLE<br>CENTER: (100, 100)<br>RADIUS: 10<br>START ANGLE: –3.14<br>END ANGLE: 0<br>THICKNESS: 1 | (90, 100, 0, 70) – (92, 98, 0, 68) –<br>(93, 93, 2, 72) – (95, 90, 3, 70) –<br>(100, 90, 2, 71) – (103, 92, 0, 69) –<br>(107, 93, 0, 65) – · · · |
| ⋮ | ⋮ | ⋮ | ⋮ |

FIG. 8

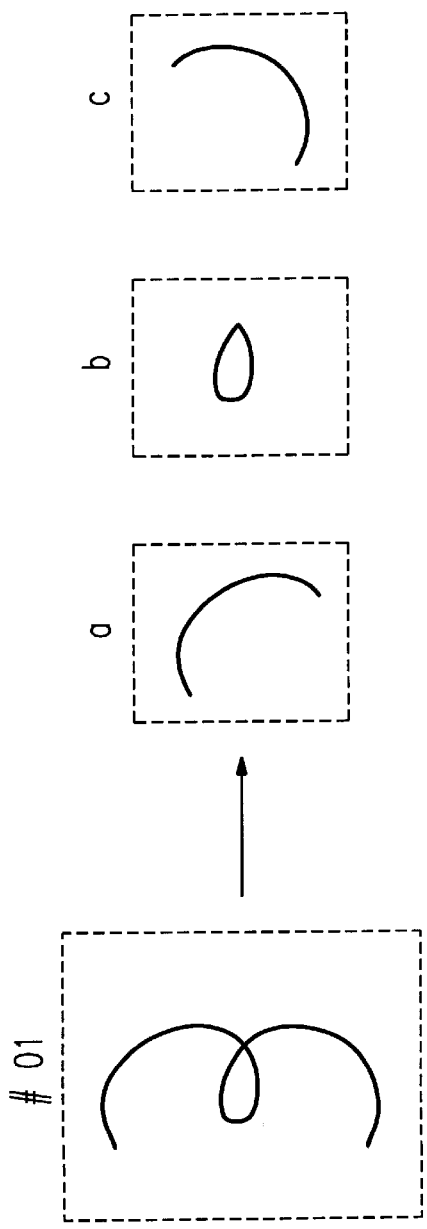
FIG. 11
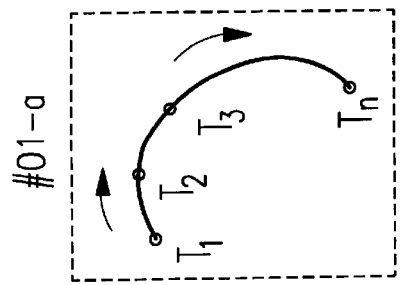
FIG. 12(a)
| FIGURE | PART | COORDINATE SERIES INFORMATION |
|---|---|---|
| #01 | a | $T_1(X_1, Y_1) - T_2(X_2, Y_2) - T_3(X_3, Y_3) \text{---} T_n(X_n, Y_n)$ |
| | b | |
FIG. 12(b)

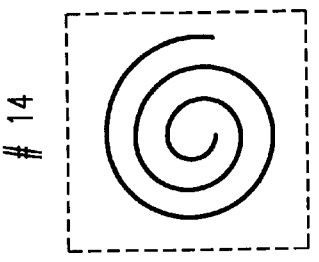
FIG.13(d) #14
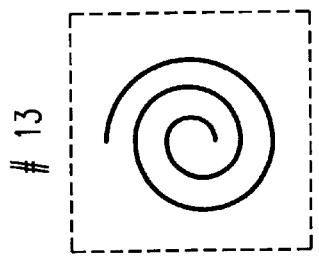
FIG.13(c) #13
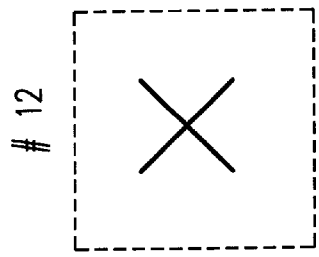
FIG.13(b) #12
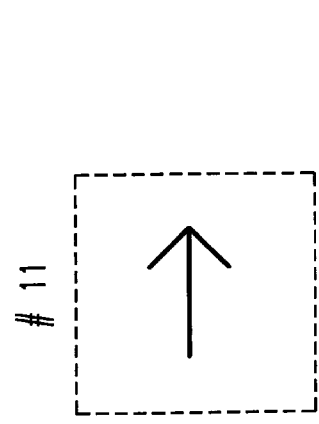
FIG.13(a) #11

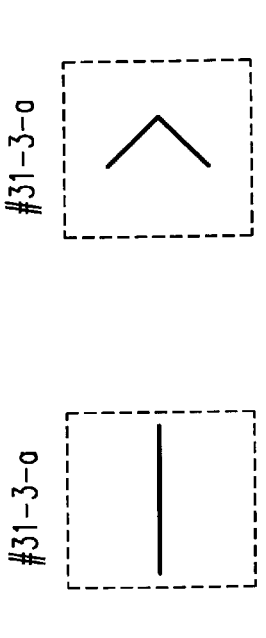
FIG. 19(a)　FIG. 19(b)　FIG. 19(c)　FIG. 19(d)　FIG. 19(e)
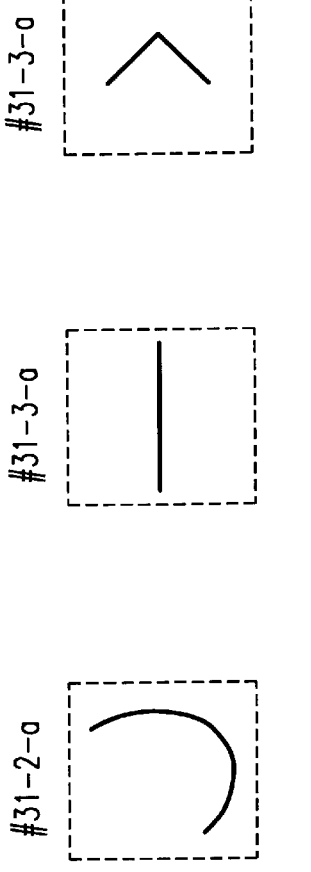
| FIGURE | PART | COORDINATE SERIES INFORMATION |
|---|---|---|
| # 31-1 | a | ------ |
|  | b | ------ |
|  | c | ------ |
| # 31-2 | a | ------ |
| # 31-3 | a | ------ |
FIG. 20
| FIGURE | PART | COORDINATE SERIES INFORMATION | SIMILAR FIGURE |
|---|---|---|---|
| # 31-1 | a | ------ | # 21-1-a |
|  | b | ------ | # 21-1-b |
|  | c | ------ | # 21-1-c |
| # 31-2 | a | ------ | # 11-1-a |
| # 31-3 | a | ------ | # 11-2-a |
FIG. 21

CHARACTER-FIGURE EDITING APPARATUS AND METHOD

BACKGROUND OF THE INVENTION

1. Field of the Invention

The present invention relates to character-figure editing apparatus and a method for correctly selecting a user's desired character and figure to be edited from a plurality of the characters and the figures on display.

2. Description of the Related Art

In a word processor (WP) and a desktop publishing (DTP) system of the prior art, when a user edits characters and figures on a display using a keyboard or a mouse, he selects a character or a figure to be edited with the cursor. By using this method, he selects a desired character and figure easily. However, if a plurality of characters and figures overlap each other on the display, it is difficult for the user to select his desired character and figure with the cursor. In this case, as a method of easy selection, a plurality of drawing areas, which are called "layers", are established in a memory. The characters and the figures are located on respective layers. When the user selects a character, the character is retrieved from one specified layer exclusively for the character. When the user selects a figure, the figure is retrieved from another specified layer exclusively for the figure. Alternatively, a method for retrieving a character or figure from a front side layer to the user on the display is considered.

Alternatively, an input-editing system for characters/figures by handwriting, i.e., by means of a pen and a tablet, can be used by the user. In this system, as a selecting means of displayed characters and figures, the user's desired area is surrounded on the display by the user's handwriter designation, which area includes his desired character or figure. This method is effective to collectively select a group of characters or figures. However, it is not effective to select an individual character and figure. For example, in the case that a plurality of handwriter curved lines cross each other on the display, it is difficult for the user to select an individual curved line by cursor.

In short, in the input-editing system of the prior art, the reliability with which a user can select desired characters and figures is insufficient. Especially in the case that a plurality of characters and figures overlap on the display, it is difficult for the user to select his desired character or figure correctly.

SUMMARY OF THE INVENTION

It is an object of the present invention to provide a character-figure editing apparatus and method for correctly selecting a user's desired character and/or figure to be edited from a plurality of characters and figures on the display.

According to the present invention, there is provided character-figure editing apparatus, comprising: input means for inputting handwritten information including a character, a figure, or an editing operation for a displayed character or figure; decision means for identifying the handwritten information as one of the character, the figure and the editing operation; memory means for storing information representing each of characters and figures identified by said decision means; display means for displaying the handwritten information inputted by said input means and one of the characters and figures stored in said memory means; and editing means for editing a previously inputted character or figure when said decision means identifies the handwritten information as including the editing operation; and wherein said input means includes storing means for temporarily storing the handwritten information as including a series of coordinates inputted in an order, and said decision means selects in said memory means a corresponding character or figure in accordance with the handwritten information stored in said storing means when the handwritten information is identified as including the editing operation.

Further in accordance with the present invention, there is provided character-figure editing method, comprising the steps of: inputting handwritten information including a character, a figure, or an editing operation for a displayed character or figure; identifying the handwritten information as one of the character, the figure and the editing operation; storing the character information and the figure information identified at the identifying step; displaying the handwritten information inputted at the inputting step and the character or the figure stored at the storing step; editing a previously inputted character or figure when the handwritten information includes the editing operation; storing the handwritten information as including a series of coordinates inputted at the inputting step in an order; and selecting a corresponding character or figure in accordance with the handwritten information stored at the storing step when the handwritten information is identified as the editing operation.

BRIEF DESCRIPTION OF THE DRAWINGS

FIG. 8 is a schematic diagram of information stored in a character/figure information memory section 3 shown in FIG. 1.

FIG. 11 is a schematic diagram of a figure pattern which is divided into plural parts.

FIGS. 12(a) and 12(b) are schematic diagrams of figure information corresponding to the figure pattern in FIG. 11.

FIGS. 13(a)–14(d) are schematic diagrams of different kinds of editing operation patterns.

FIGS. 14(a)–14(d) are schematic diagrams of editing operation information corresponding to the editing operation patterns in FIG. 13.

FIGS. 19(a)–19(e) are schematic diagrams of plural parts for the handwriting-editing operation in FIG. 17.

FIG. 20 is a schematic diagram of editing operation information corresponding to the plural parts in FIG. 19.

FIG. 21 is a schematic diagram of decision results including a similar figure of each part.

DETAILED DESCRIPTION OF THE PREFERRED EMBODIMENTS

Figure 1:
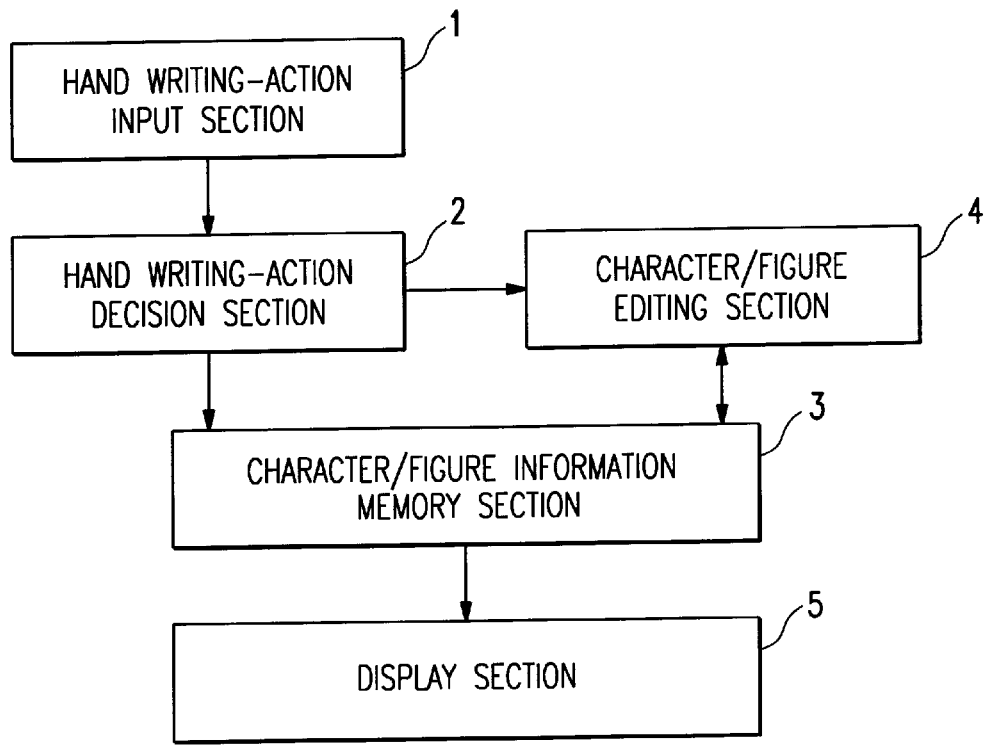
FIG. 1 is a schematic diagram of character-figure editing apparatus according to the present invention.

An embodiment of the present invention will be explained in detail with reference to the figures. FIG. 1 is a schematic diagram of character-figure editing apparatus according to the present invention. A handwriting-action input section 1, i.e., a pen and a tablet, inputs characters and figures by means of the user's handwriting. In this case, information of the pen's action on the tablet, i.e., a series of coordinates of the handwriting (vector information of the action of the user's hand) is inputted through the handwriting-action input section 1. A handwriting-action decision section 2 decides that the series of coordinates of the handwriting is one of an input character, an input figure, or an editing operation for a displayed character/figure. A character/figure information memory section 3 stores the decision result from the handwriting-action decision section 2. The decision result is one of character information newly inputted, figure information newly inputted or an editing operation information. In short, the decision result and the series of coordinates of the handwriting are stored in the character/figure information memory section 3. A character/figure editing section 4 reads the character information and the figure information from the character/figure information memory section 3. In the case that the handwriting-action decision section 2 decides that the series of coordinates of the handwriting is an editing operation, the character/figure editing section 4 selects the character or the figure to be edited and edits the selected character/figure in accordance with the editing operation. In short, attribute information or coordinate series information of the selected character/figure is updated. Then, the updated information of the selected character/figure is re-stored in the character/figure information memory section 3. A display section 5 displays the character and the figure stored in the character/figure information memory section 3. In the case that the handwriting-action decision section 2 decides the series of coordinates of the handwriting is the editing operation, the display section 5 displays the selected situation of the characters/figures and the editing result, i.e., moved or changed characters/figures in accordance with the editing operation.

The handwriting-action input section 1 and the display section 5 may be input-display apparatus in a single module, i.e., one module consisting of the pen, the tablet and the display.

Figure 2:
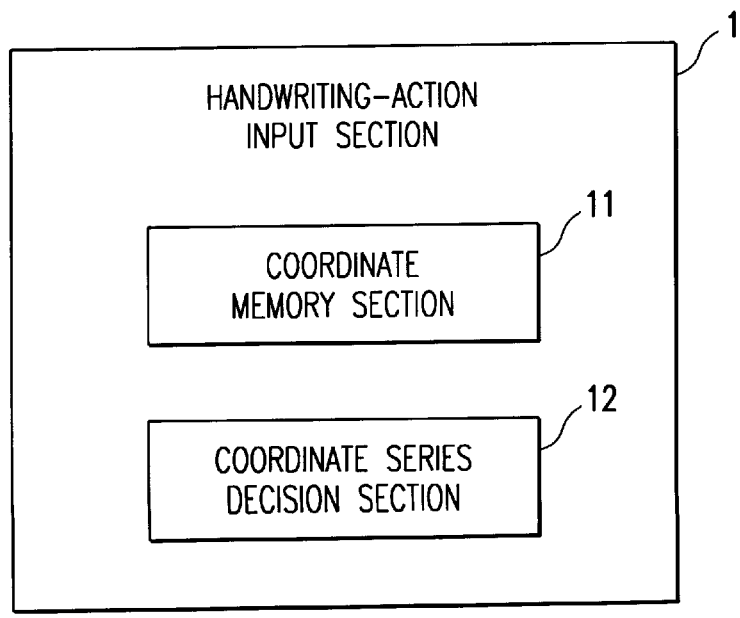
FIG. 2 is a schematic diagram of a handwriting-action input section 1 shown in FIG. 1.
Figures 3, 4:
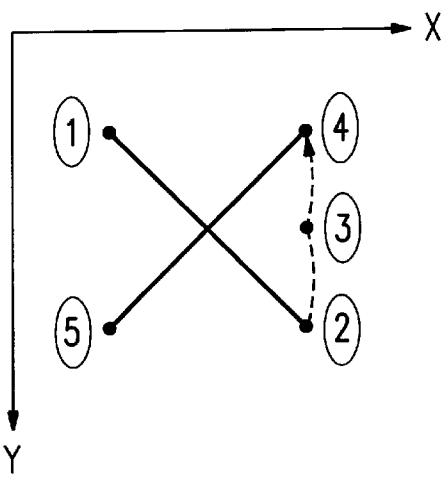
FIG. 3 is a schematic diagram of information stored in a coordinate memory section 11 shown in FIG. 2.
FIG. 4 is a schematic diagram of handwriting corresponding to the information shown in FIG. 3.

Next, details of the processing performed in each section shown in FIG. 1 will be explained. FIG. 2 is a schematic diagram of the handwriting-action input section 1. The series of coordinates of the handwriting and pen-information are stored in a coordinate memory section 11. FIG. 3 is a schematic diagram of information stored in the coordinate memory section 11. As shown in FIG. 3, (X,Y) coordinate information, switch on/off information, pen-distance and pen-slope information corresponding to time information are stored in the coordinate memory section 11. For example, when the user writes characters or figures on the tablet using the pen, the tablet generates (X,Y) coordinate values in an order according to the handwriting. In this case, time information and switch information corresponding to each (X,Y) coordinate are generated from the tablet. The switch information "ON" represents the start point for inputting (X,Y) coordinates. The switch information "OFF" represents the end point for inputting (X,Y) coordinates. At the same time, the pen-distance and the pen-slope information is detected. The pen-distance represents a distance between the pen and the tablet. In the case of detecting pen-distance, an electrostatic capacity between the pen and the tablet is measured and the distance is calculated according to the electrostatic capacity. The pen-slope repesents a slope angle between the pen and the tablet. In the case of detecting pen-slope, two oscillators are respectively equipped in both ends of the pen. The signals from the two oscillators are received by receivers set in the periphery of the tablet. Then, two spacial coordinates of both ends of the pen are calculated according to the received signals and the pen-slope is calculated according to the two spacial coordinates.

When the (X,Y) coordinate and other information are stored in the coordinate memory section 11, the coordinate series decision section 12 divides this information according to units of time. As shown in FIG. 3, five units of the information corresponding to times ①②③④⑤ are stored in the coordinate memory section 11. FIG. 4 is a schematic diagram of the handwriting corresponding to the information shown in FIG. 3. The start point for inputting (X,Y) coordinates is ① and the end point for inputting (X,Y) coordinates is ⑤. The pen-distances of the points ①②④⑤ are "0" and the pen-distance of the point ③ is "5". In this case, as shown in FIG. 4, the first stroke between points ① and ② and the second stroke between points ④ and ⑤ represent direct handwriting on the tablet. On the other hand, a dotted line corresponding to ③ in FIG. 4 is a spacial moving line of the pen because the pen-distance of the point ③ is not "0". In this way, the handwriten character "X" is stored as (X,Y) coordinates and the other information.

Figures 5, 6:
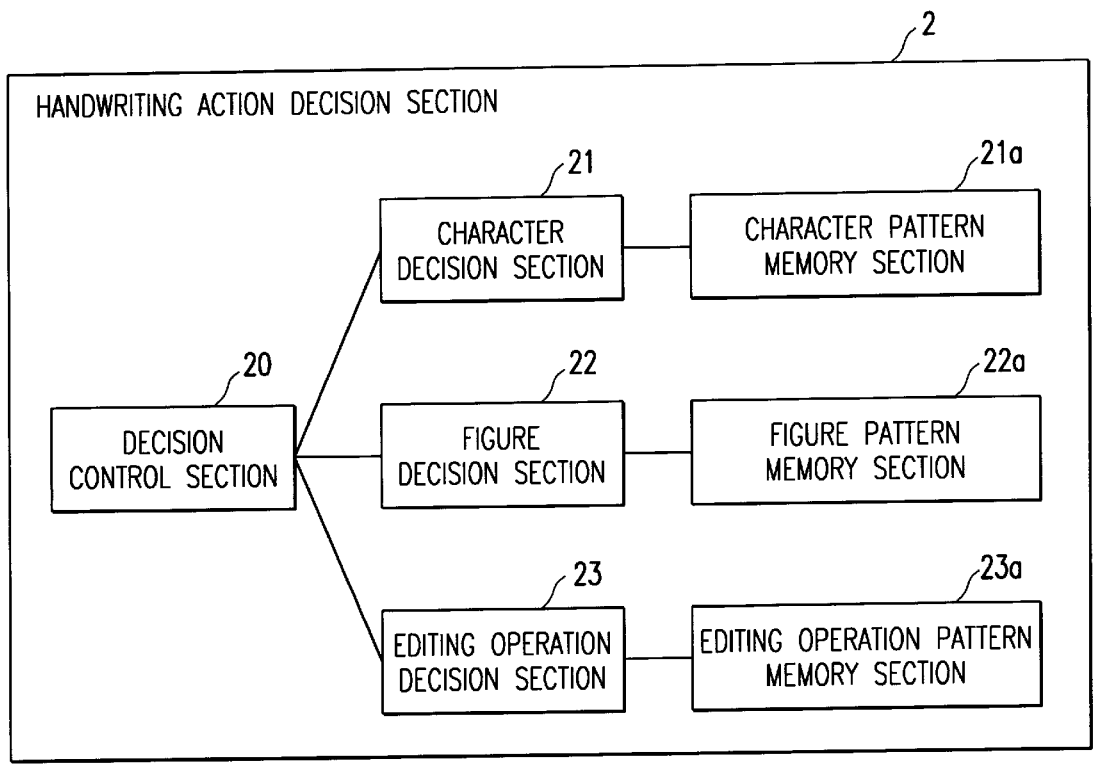
FIG. 5 is a schematic diagram of a handwriting action decision section 2 shown in FIG. 1.
FIG. 6 is a schematic diagram of information stored in an editing operation pattern memory section 23=i ashown in FIG. 5.

FIG. 5 is a schematic diagram of the handwriting action decision section 2 shown in FIG. 1. In FIG. 5, a decision control section 20 controls the processes of a character decision section 21, a figure decision section 22 and an editing operation decision section 23. In short, when handwriting information is inputted through the handwriting-action input section 1, the handwriting information is supplied to the editing operation decision section 23, the character decision section 21 and the figure decision section 22 in sequence. The editing operation decision section 23 decides whether the handwriting information coincides with a character/figure already written by the user, and decides whether the handwriting information is an editing operation pattern or not. FIG. 6 is a schematic diagram of information stored in an editing operation pattern memory section 23a in FIG. 5. As shown in FIG. 6, this information includes handwriting patterns and corresponding editing operations. Therefore, the editing operation decision section 23 decides whether the coordinate series of the handwriting pattern coincides with the editing operation pattern by referring to the editing operation pattern memory section 23a. The character decision section 21 decides whether the handwriting information coincides a the character pattern or not. A character pattern memory section 21a previously stores a plurality of standard character patterns. Therefore, if the user for the first time writes a character on the tablet with the pen, the handwriting pattern is matched with one of the standard character patterns. The figure decision section 22 decides whether the handwriting information coincides with a figure pattern or not. A figure pattern memory section 22a previously stores a plurality of standard figure patterns. Therefore, if the user for the first time writes a figure on the tablet with the pen, the handwriting pattern is matched with one of the standard figure patterns.

Figure 7:
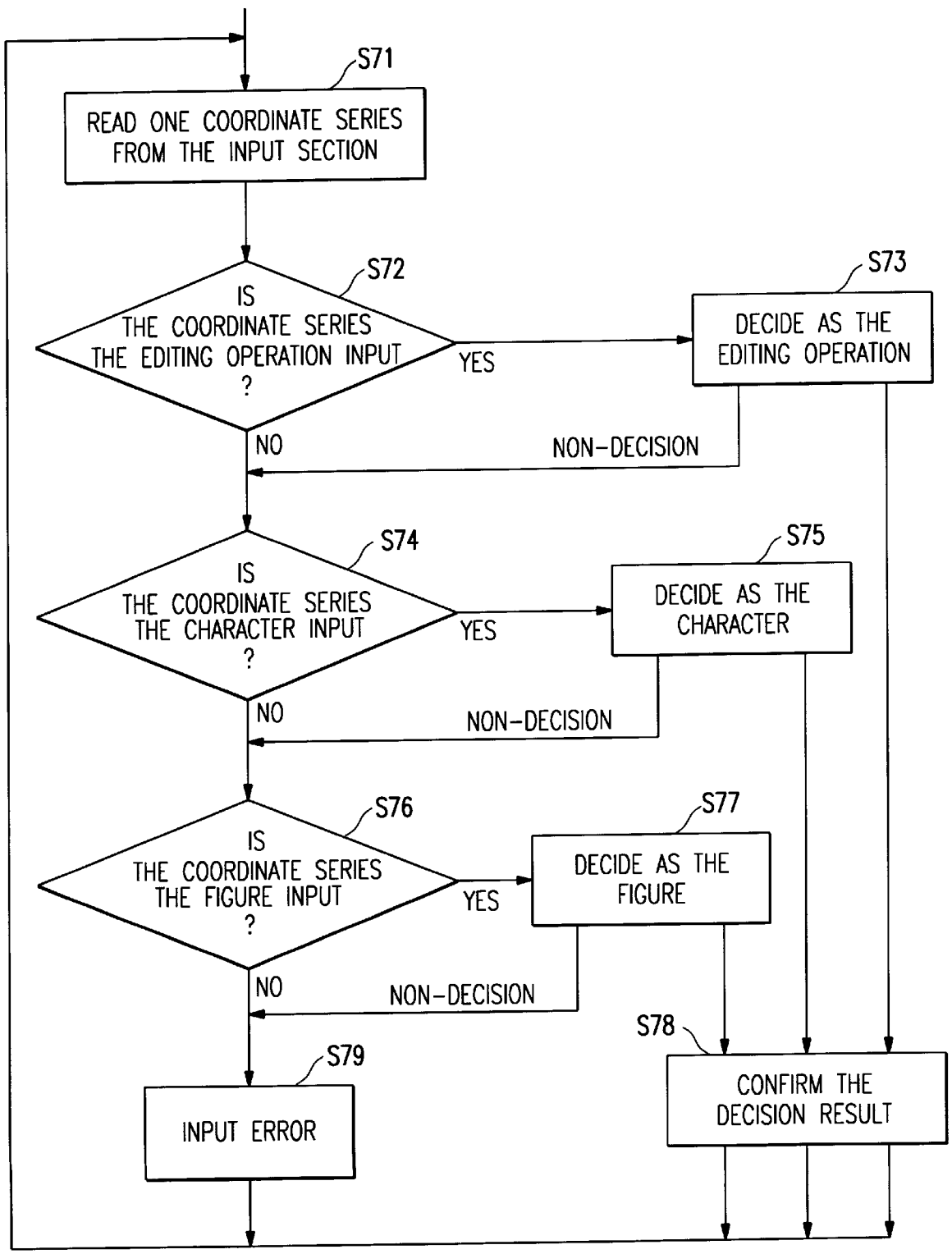
FIG. 7 is a flow chart of processing of the handwriting-action decision section 2.

FIG. 7 is a flow chart of processing performed by the handwriting-action decision section 2. When the handwriting-action input section 1 inputs the handwriting pattern as a series of coordinates, the decision control section 20 reads the series of coordinates one by one (S71). First, the series of coordinates is sent to the editing operation decision section 23. The editing operation decision section 23 compares the series of coordinates of the handwriting with the character/figure pattern which the user has already written and which is stored in the character/figure information memory section 3 (S72). If the series of coordinates of the handwriting almost matches with the character/figure pattern, it is decided that the user traced the character/figure pattern in order to select the pattern for editing on the tablet. In this case, the user must input a kind of editing operation. Therefore, the editing operation decision section 23 compares the series of coordinates of handwriting inputted next with the handwriting patterns stored in the editing operation pattern memory section 23a. In this way, it is decided which character/figure pattern is to be edited and what kind of editing operation is to be performed(S73). Then, the character/figure editing section 4 edits the selected character/figure pattern according to the selected kind of editing operation. For example, an attribute of the selected character/figure pattern may be changed (erase, move, magnification, reduction, etc.). This editing result is displayed on the display section 5 to confirm the decision result (S78).

If the series of coordinates of the handwriting is not matched with a character/figure pattern in the character/figure information memory section 3, or if the series of coordinates of handwriting inputted next is not matched with a handwriting pattern in the editing operation pattern memory section 23a, the series of coordinates of the handwriting is sent to the character decision section 21. The character decision section 21 compares the series of coordinates of the handwriting with the standard character patterns in the character pattern memory section 21a (S74). If the series of coordinates of the handwriting is matched with one of the standard character patterns, it is decided to be the one of the standard characters as a newly input character (S75). This result is displayed to confirm the decision result(S78).

If the series of coordinates of the handwriting is not matched with any of the standard character patterns, the series of coordinates of the handwriting is sent to the figure decision section 22. The figure decision section 22 compares the series of coordinates of the handwriting with the standard figure patterns in the figure pattern memory section 22a (S76). If the series of coordinates of the handwriting is matched with one of the standard figure patterns, it is decided to be the one of the standard figures as a newly input figure (S77). This result is displayed to confirm the decision result(S78).

If the series of coordinates of the handwriting is not matched with any of the standard figure patterns, an input error message (it is impossible to decide) is displayed to the user on the display section 5 (S79).

Figure 9B:
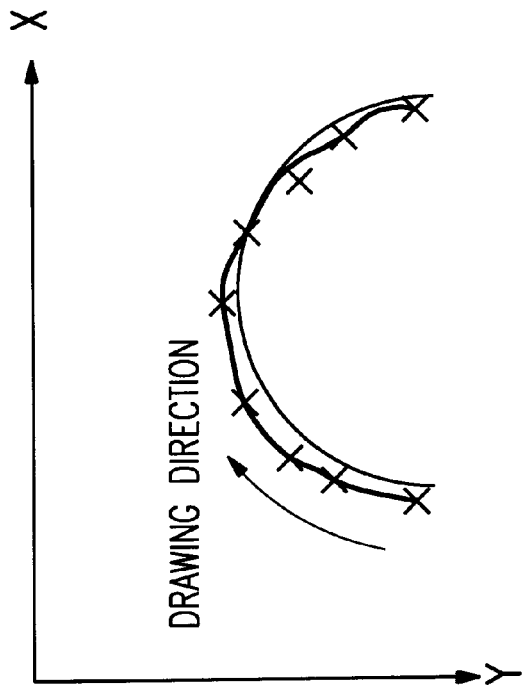
FIGS. 9(a) and 9(b) are schematic diagrams of the characters and the figures on the display according to the information shown in FIG. 8.
Figure 9A:
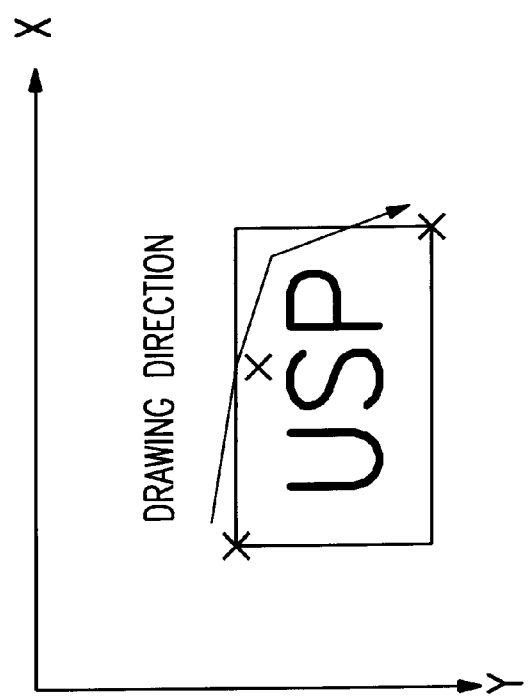

FIG. 8 is a schematic diagram of information stored in the character/figure information memory section 3 in FIG. 1. FIG. 9 is a schematic diagram of the characters and the figures outputted on the display section 5 according to the information shown in FIG. 8. As shown in FIG. 8, the information consists of number, kind, attribute information and coordinate series information. When the character/figure is inputted by handwriting, the series of coordinates, the pen-distance and the pen-slope are sequentially stored as the coordinate series information. At the same time, characteristic features except for the coordinate series information are stored by unit of respective character/figure. FIG. 9(a) is characters on the display according to the information of number 11 in FIG. 8. In FIG. 9(a), the character pattern "USP" is displayed according to a series of (X,Y) coordinates of the coordinate information, and area and size of the attribute information. Additionally, a drawing direction of the user's handwriting is displayed by an arrow line. FIG. 9(b) is figures on the display according to the information of number 12 in FIG. 8. In FIG. 9(b), a semicircle pattern is displayed according to a series of (X,Y) coordinates of the coordinate information, and center, radius, start angle, end angle and thickness of the attribute information. Additionally, a drawing direction of the user's handwriting is displayed by an arrow line.

Figure 10:
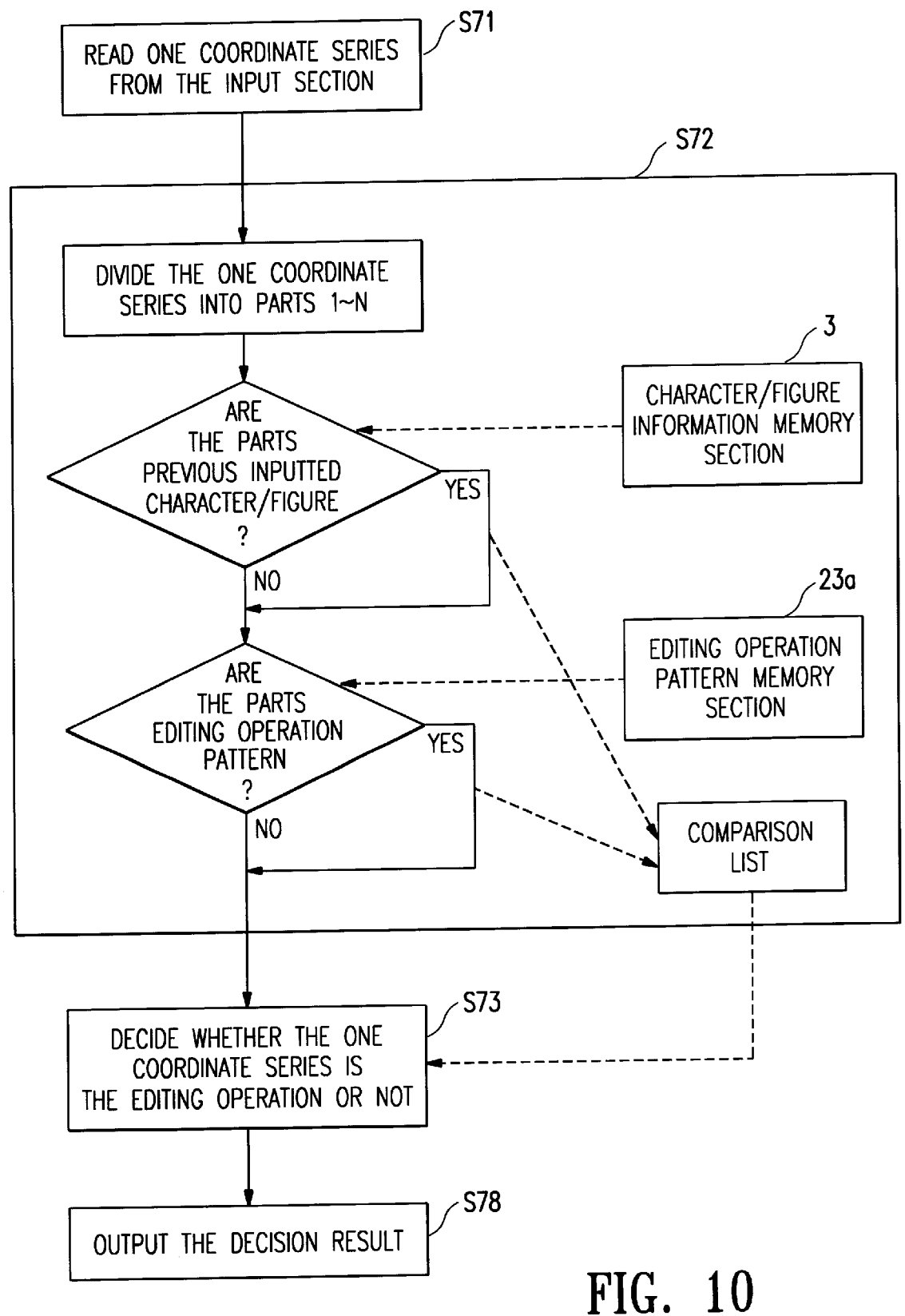
FIG. 10 is a flow chart of processing of an editing operation shown is FIG. 7.
Figure 14A:
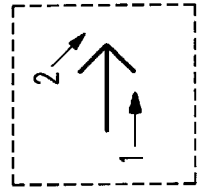
Figure 14B:
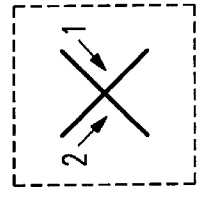
Figure 14C:
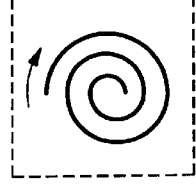
Figure 14D:
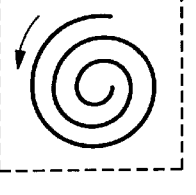

FIG. 10 is a flow chart of processing of the editing operation decision section 23. The steps (S71,S72,S73,S78) in FIG. 10 correspond to each step (S71,S72,S73,S78) in FIG. 7. The details of the processing will be explained by using a specific example. In acccordance with the present invention, the figure pattern is divided into plural parts. In FIG. 11, the figure pattern #01 is divided into three parts a,b,c. A part is defined as a closed curved line or an open curved line each of which does not cross. The figure information is stored by unit of part as shown in FIGS. 12(a) and 12(b). As for the part #01-a shown in FIG. 12(a), the coordinate series information (X,Y) at times (T1,T2, . . . , Tn) is sequentially stored in the character/figure information memory section 3 as shown in FIG. 12(b). FIGS. 13(a)–13(d) show four kinds of editing operation patterns. In the same way as shown in FIG. 6, the pattern #11 represents a move-operation, the pattern #12 represents an erase-operation, the pattern #13 represents a reduction-operation and the pattern #14 represents a magnification-operation. FIGS. 14(a)–14(d) show four editing operation patterns (left side of figure) with handwriting order (arrow line) and the editing operation information (right side of figure) in the editing operation pattern memory section 23a. In the same way shown in FIG. 12, the editing operation information is stored by unit of part.

Figure 15:
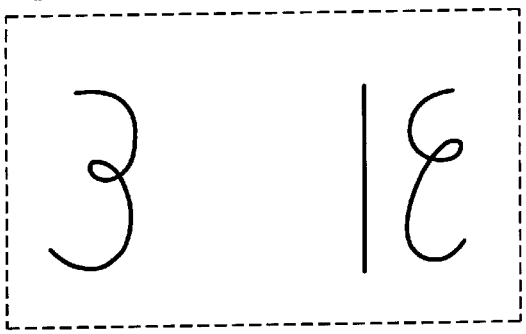
FIG. 15 is a schematic diagram of a handwriting-figure previously inputted by the user.
Figure 16:
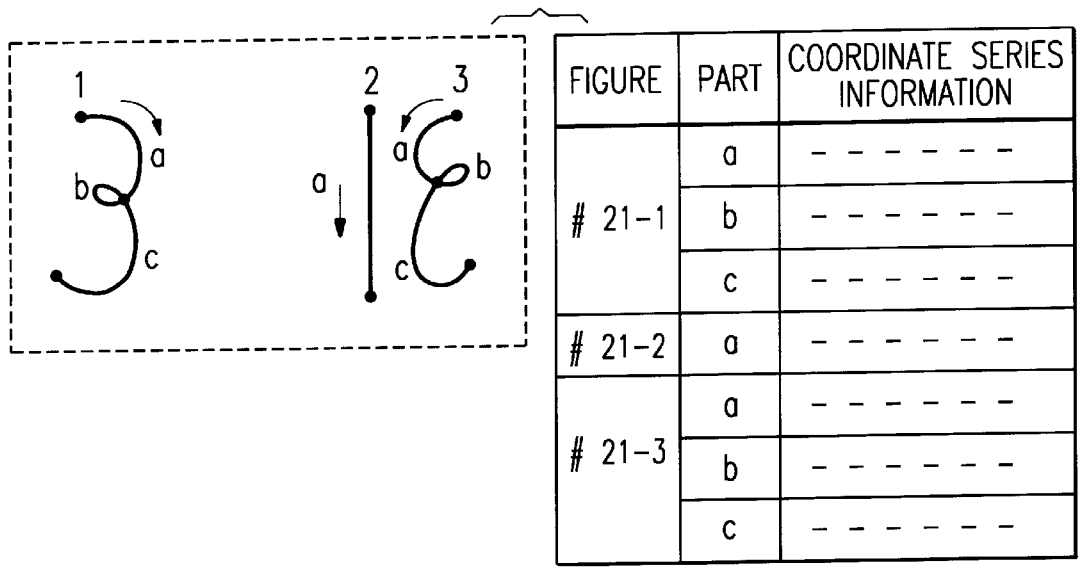
FIG. 16 is a schematic diagram of figure information corresponding to the handwriting-figure pattern in FIG. 15.
Figure 17:
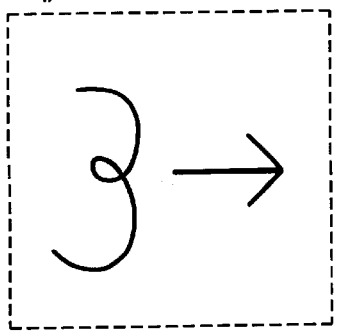
FIG. 17 is a schematic diagram of a handwriting-editing operation inputted by the user.
Figure 18:
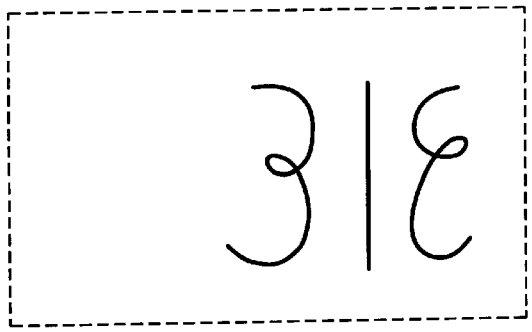
FIG. 18 is a schematic diagram of an editing result for the handwriting-figure pattern in FIG. 15.

For example, it is assumed that the user previously inputs the figure #21 by handwriting as shown in FIG. 15. In this case, the character/figure information memory section 3 stores the figure information by unit of part as shows in FIG. 16. The left figure #21-1 in FIG. 15 is divided into three parts a,b,c, the center figure #21-2 in FIG. 15 is only one part and the right figure #21-3 in FIG. 15 is divided into three parts a,b,c. Next, it is assumed that the user inputs the handwriting pattern #31 to edit the figure as shown in FIG. 17. The handwriting pattern #31 in FIG. 17 consists of one traced figure pattern (left figure) and one editing operation pattern (right figure). FIG. 18 shows the editing result which the user wants to achieve. In comparison with the figure #21 in FIG. 15, the left figure #21-1 in FIG. 16 is moved toward the middle figure #21-2 as shown in FIG. 18. The handwriting pattern #31 in FIG. 17 is divided into five parts as shown in FIGS. 19(a)–19(e). In short, the left figure consists of one stroke #31-1, which is divided into three parts a,b,c (#31-1-a,#31-1-b,#31-1-c). The right figure is consisted of two strokes #31-2 and #31-3, each of which is one part a (#31-2-a,#31-3-a). The coordinate series information of the handwriting pattern #31 is stored by unit of part as shown in FIG. 20. First, the coordinate series information of each part is compared with the coordinate series information of each part of figure #21 in FIG. 16. If the coordinate series of plural parts of the handwriting pattern #31 coincide with the coordinate series of figure #21, the plural parts are decided to be the same as figure #21 which the user traced again. Second, the coordinate series information of each part of the handwriting pattern #31 is compared with the coordinate series of each part of the editing operation patterns #11~#14 in FIG. 14. If the coordinate series of the other parts of the handwriting pattern #31 coincide with the coordinate series of one of the editing operation patterns, then the other parts are decided to be the one of the editing operation pattern which the user inputted. In this case, the left figure #31-1 of the handwriting pattern #31 is matched with the previous inputted figure #21-1 in FIG. 16. The right figures #31-2, #31-3 of the handwriting pattern #31 are respectively matched with the editing operation patterns #11-1,#11-2 in FIG. 14. As shown in FIG. 21, the comparison list stores the similar figure by unit of part of the handwriting pattern #31. Therefore the handwriting pattern #31 is decided to be the move operation #11 in the right direction for the figure #31-1.

Figure 22A:
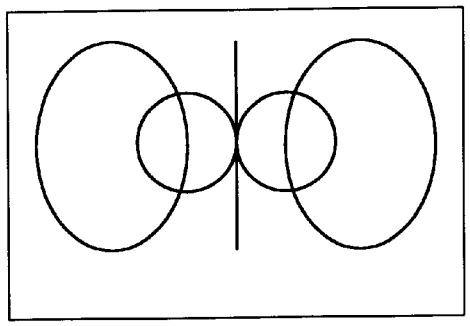
FIGS. 22(a)–22(c) are schematic diagrams of a display situation of selecting a desired figure on the display.
Figure 22B:
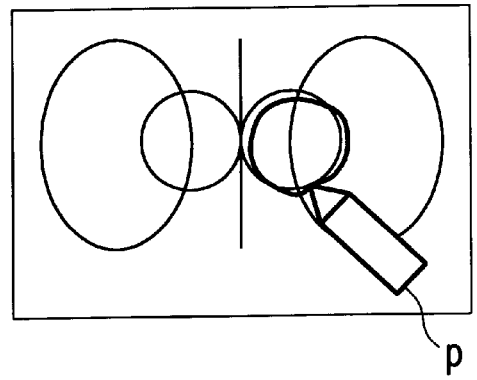
Figure 22C:
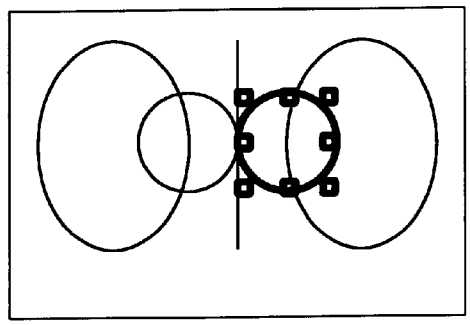

FIGS. 22(a)–22(c) are schematic diagrams of a display situation for selecting a desired figure on the display. It is assumed that a plurality of figures (four circles and one vertical line) are displayed as shown in FIG. 22(a). Then, the user selects with the pen "P" one figure to be edited on the display as shown in FIG. 22(b). For example, the user traces the figure he desires to select by means of the pen on the tablet. In this case, one figure whose coordinate series is almost the same as the coordinate series of the user's tracing is selected from five figures. Then, the selected figure is highlighted in the displayed as shown in FIG. 22(c). Then, the user can input an editing operation to edit the selected figure by handwriting. The one figure is edited (move, erase, etc.) according to the editing operation on the display.

Figure 23A:
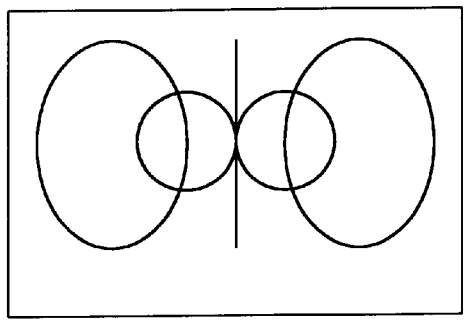
FIGS. 23(a)–23(d) are schematic diagrams of a display situation of plural candidates as the selected figure on the display.
Figure 23B:
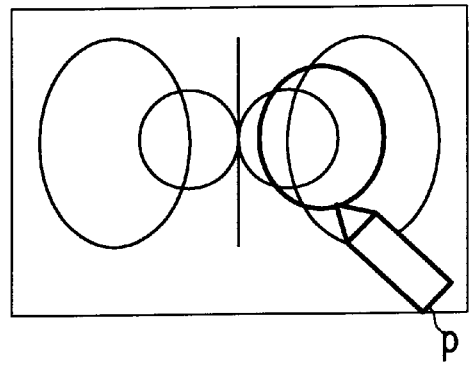
Figure 23C:
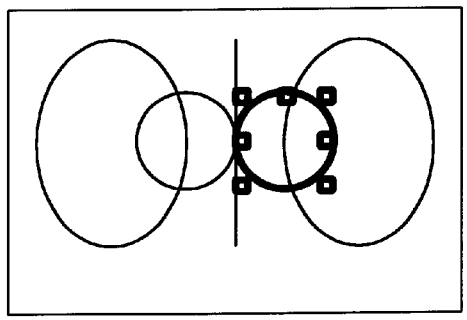
Figure 23D:
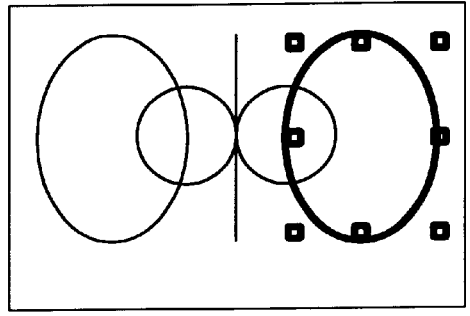

FIGS. 23(a)–23(d) are schematic diagrams of a display situation of plural candidates for the selected figure on the display. In the case that the five figures are displayed as shown in FIG. 23(a), the user traces the figure he desires to edit with the pen "P" as shown in FIG. 23(b). In this case, two figures (one small circle, one big circle) whose coordinate series are near to the coordinates series of the user's tracing are selected from the five figures. First, one candidate of the two figures is highlighted on the display as shown in FIG. 23(c). When the user commands to display the next candidate through the input section 1 (for example, by push a key), the other candidate of the two figures is highlighted on the display as shown in FIG. 23(d). In this manner, the user can confirm his selection.

Figure 24A:
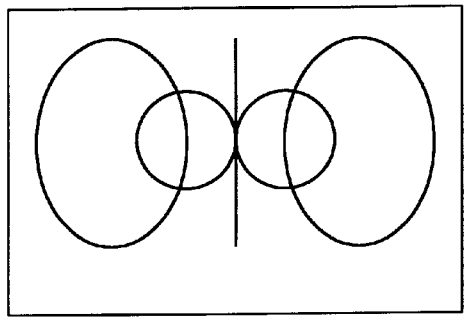
FIGS. 24(a)–24(d) are schematic diagrams of a display situation of plural figures including the coordinate series of the user's handwriting on the display.
Figure 24B:
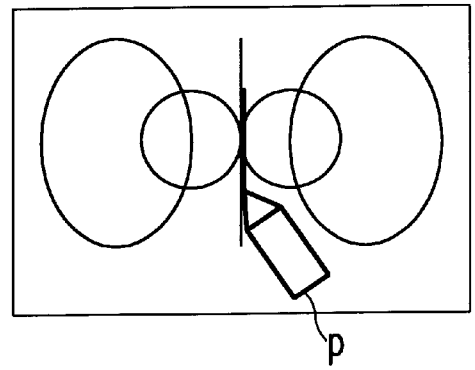
Figure 24C:
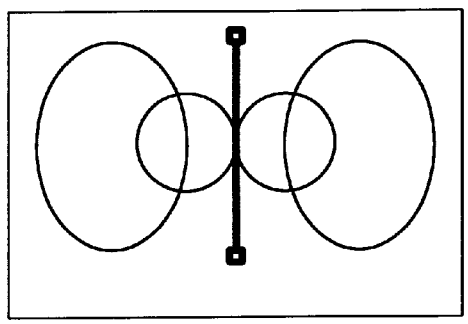
Figure 24D:
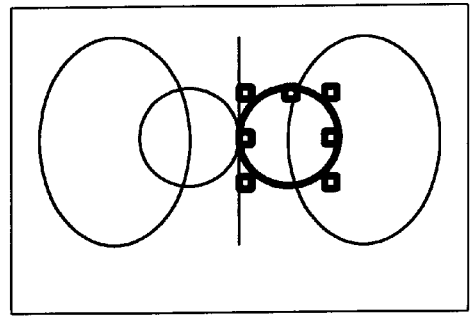

FIGS. 24(a)–24(d) are schematic diagrams of a display situation of plural figures including the coordinate series of the user's handwriting on the display. In the case that the five figures are displayed as shown in FIG. 24(a), the user traces one figure (one line) with the pen "P" as shown in FIG. 24(b). In this case, two figures (one line, one small circle) which respectively include the coordinate series of the user's tracing are selected from the five figures. First, the one line is highlighted on the display as shown in FIG. 24(c). When the user commands to display the next candidate through the input section 1, the one small circle is highlighted on the display as shown in FIG. 24(d). In this manner, the user can confirm his selection.

In FIGS. 23(a)–23(d), two figures whose coordinate series are near to the coordinates series of the user's tracing are selected from five figures. However, in addition to above decision, one figure whose drawing direction of the coordinate series is the same as the drawing direction of the coordinate series of the user's tracing may be selected from the two figures. As shown in FIG. 8, a series of (X,Y) coordinates is stored in the character/figure information memory section 3. Therefore, a vector of the user's drawing direction is calculated from the series of (X,Y) coordinates. For example, in FIG. 23(a), it is assumed that a small circle on the right side was drawn by user A and a big circle on the right side was drawn by user B. In this case, the character/figure information memory section 3 stores a series of coordinates of the small circle which was drawn by the user A and a series of coordinates of the big circle which was drawn by the user B. In short, a vector of the drawing direction of the user A's handwriting and a vector of the drawing direction of the user B's handwriting are stored. When user A traces his small circle to be edited on the display, it often happens that the small circle and the big circle are selected because the circle he traced is positioned between the small circle and the big circle as shown in FIG. 23(b). However, the small circle is selected from the two circles because a vector drawing direction of the small circle is the same as a vector of the drawing direction of user A's tracing circle. In this way, in view of the vector of drawing direction of personal handwriting, a predetermined figure which a specific user previously drew is correctly selected from a plurality of figures on the display.

Additional advantages and modifications will readily occur to those skilled in the art. The invention in its broader aspects is therefore not limited to, the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Character-figure editing apparatus, comprising:

display means for displaying a plurality of characters or figures, each of which was previously inputted by a user as a first handwritten information;

memory means for storing the first handwritten information of each of the plurality of characters or figures as attribute information and a first series of coordinates inputted in an order, the attribute information including characteristics of the character or the figure, and the first series of coordinates including (X,Y) coordinates, a distance and a slope between a pen and a tablet;

input means for inputting a second handwritten information by the user tracing on at least one of the plurality of characters or figures displayed by said display means, the input means comprising the pen and the tablet for the user to handwrite on the tablet to draw the plurality of characters or figures, or an editing operation;

storing means for temporarily storing the second handwritten information inputted by said input means as a second series of coordinates inputted in an order, the second series of coordinates including (X, Y) coordinates, switch on/off information, a distance and a slope between the pen and the tablet;

decision means for comparing the second handwritten information stored in said storing means with the first handwritten information stored in said memory means, and for selecting the character or the figure represented in said memory means by the first handwritten information that coincides with the second handwritten information in said storing means; and editing means for editing the selected character or figure by the editing operation inputted by the user.

2. The character-figure editing apparatus according to claim 1, wherein said decision means includes an editing operation memory means for storing a plurality of handwritten patterns and associated editing operations for use in identifying the inputted handwritten information as one of the associated editing operations.

3. The character-figure editing apparatus according to claim 1, wherein said input means inputs a handwritten information by the user as the editing operation for the selected character or figure, and said display means displays the handwritten information of the editing operation inputted by said input means.

4. The character-figure editing apparatus according to claim 3, wherein said decision means includes means for identifying a kind of editing operation of the inputted handwritten information after the handwritten information is selected as coinciding with the character or figure information, in accordance with the handwritten patterns stored in said editing operation memory means.

5. The character-figure editing apparatus according to claim 4, wherein said decision means identifies the handwritten information as a newly inputted character or figure when the handwritten information does not coincide with the character or figure information in said memory means.

6. The character-figure editing apparatus according to claim 1, wherein said display means highlights the display of the character or figure selected by said decision means in comparison with the other characters and figures displayed.

7. The character-figure editing apparatus according to claim 6, wherein said display means displays a plurality of the characters or figures one by one which are selected by said decision means when the handwritten information corresponds to a plurality of the character or figure information in said memory means.

8. Character-figure editing method, comprising the steps of:

displaying a plurality of characters or figures, each of which was previously inputted by a user as a first handwritten information;

storing the first handwritten information of each of the plurality of characters or figures as attribute information and a first series of coordinates inputted in an order, the attribute information including characteristics of the character or the figure, and the first series of coordinates including (X, Y) coordinates, a distance and a slope between a pen and a tablet;

inputting a second handwritten information through an input means by the user tracing on at least one of the plurality of characters or figures displayed at the displaying step, the input means comprising the pen and the tablet for the user to handwrite on the tablet to draw the plurality of characters or figures, or an editing operation;

storing the second handwritten information inputted at the inputting step as a second series of coordinates inputted in an order, the second series of coordinates including (X, Y) coordinates, switch on/off information, a distance and a slope between the pen and the tablet;

comparing the first handwritten information with the second handwritten information;

selecting one of the plurality of characters or figures stored at the first storing step by the first handwritten information that coincides with the second handwritten information stored at the second storing step; and editing the one of the plurality of characters or figures selected at the selecting step by the editing operation inputted by the user.

9. A computer readable memory containing computer-readable instructions, comprising:

instruction means for causing a computer to display a plurality of characters or figures, each of which was previously inputted by a user as a first handwritten information;

instruction means for causing the computer to store the first handwritten information of each of the plurality of characters or figures as attribute information and a first series of coordinates inputted in an order, the attribute information including characteristics of the character or the figure, and the first series of coordinates including (X, Y) coordinates, a distance and a slope between a pen and a tablet;

instruction means for causing the computer to input a second handwritten information through an input means by the user tracing on at least one of the plurality of characters or figures displayed, the input means comprising the pen and the tablet for the user to handwrite on the tablet to draw the plurality of characters or figures, or an editing operation;

instruction means for causing the computer to store the second handwritten information of the user tracing as a second series of coordinates inputted in an order the second series of coordinates including (X, Y) coordinates, switch on/off information, a distance and a slope between the pen and the tablet;

instruction means for causing the computer to compare the second handwritten information of the user tracing with the first handwritten information of each of the plurality of characters or figures;

instruction means for causing the computer to select the character or the figure from the plurality of characters or figures by the first handwritten information that coincides with the second handwritten information of the user tracing; and instruction means for causing the computer to edit the selected character or figure by the editing operation inputted by the user.

* * * * *